United States Patent
Habouzit et al.

(10) Patent No.: US 10,198,452 B2
(45) Date of Patent: Feb. 5, 2019

(54) DOCUMENT TRACKING FOR SAFE SAVE OPERATIONS

(71) Applicant: Apple Inc., Cupertino, CA (US)

(72) Inventors: Pierre Habouzit, Triel sur Seine (FR); Dominic B. Giampaolo, Lewiston, ME (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 14/502,577

(22) Filed: Sep. 30, 2014

(65) Prior Publication Data
US 2015/0347440 A1    Dec. 3, 2015

Related U.S. Application Data

(60) Provisional application No. 62/005,818, filed on May 30, 2014, provisional application No. 62/005,978, filed on May 30, 2014.

(51) Int. Cl.
*G06F 17/30* (2006.01)
*G06F 11/14* (2006.01)

(52) U.S. Cl.
CPC .... *G06F 17/30144* (2013.01); *G06F 11/1448* (2013.01); *G06F 17/3023* (2013.01); *G06F 17/30123* (2013.01); *G06F 17/30218* (2013.01); *G06F 11/1451* (2013.01)

(58) Field of Classification Search
CPC .................................................. G06F 17/3023
USPC ........................................................ 707/638
See application file for complete search history.

(56) References Cited

U.S. PATENT DOCUMENTS

| 7,747,634 B2* | 6/2010 | Sreenivas | ......... G06F 17/30115 707/736 |
| 8,495,750 B2 | 7/2013 | Ruso | |
| 8,655,898 B2 | 2/2014 | Rao et al. | |
| 2006/0288056 A1* | 12/2006 | Yamakawa | ......... G06F 17/3023 |

(Continued)

FOREIGN PATENT DOCUMENTS

WO    WO 2005043279 A2    5/2005

OTHER PUBLICATIONS

Soules, et al., "Metadata Efficiency in a Comprehensive Versioning File System", School of Computer Science, Carnegie Mellon University, Pittsburgh PA, May 2002, pp. 1-31.

*Primary Examiner* — Robert W Beausoliel, Jr.
*Assistant Examiner* — Nirav K Khakhar
(74) *Attorney, Agent, or Firm* — Womble Bond Dickinson (US) LLP

(57) ABSTRACT

Systems and methods are disclosed that track a document within a file system using document identifier (DOCID) that is preserved during safe save operations. The DOCID can be a universally unique identifier (UUID). The DOCID can be generated on a local file system or generated during a synchronization process with a remote synchronization service. Applications can opt in to document tracking. The kernel of the operating system can monitor file system operations on a per-application and per-thread basis and determine when a processing thread is about to perform a safe save. When a sequence of file system operations indicates that a safe save is to be performed, the kernel can generate and store a tombstone record that includes the DOCID and other metadata of the tracked document and pass the DOCID and metadata to the newly saved document.

22 Claims, 13 Drawing Sheets

(56) References Cited

U.S. PATENT DOCUMENTS

2007/0094312 A1†   4/2007   Sim-Tang  
2008/0040388 A1†   2/2008   Petri et al.  
2008/0126440 A1*   5/2008   Dryfoos .................... G06F 8/71  
2009/0024674 A1†   1/2009   Gallagher  
2009/0248757 A1*   10/2009   Havewala ........... G06F 17/3023

\* cited by examiner  
† cited by third party

DOCUMENT TRACKING FOR SAFE SAVE OPERATIONS

RELATED APPLICATIONS

The present U.S. Patent application claims priority under 35 U.S.C. § 119(e) of the following U.S. Patent applications, each of which is incorporated herein by reference to the extent they are consistent with this disclosure:

(1) Application No. 62/005,818, filed May 30, 2014, and entitled "DOCUMENT TRACKING FOR SAFE SAVE OPERATIONS;" and
(2) Application No. 62/005,978, filed May 30, 2014, and entitled "SYNCHRONIZATION SYSTEM FOR MULTIPLE CLIENT DEVICES."

TECHNICAL FIELD

This disclosure relates to the field of tracking documents in a file system.

BACKGROUND

Tracking a document through changes to the document can be useful for backup and synchronization operations. A common way to track a document is to save a file identifier that is unique within a file system, such as a POSIX file identifier, in a metadata structure associated with the document. Techniques for tracking a document are known in the art, including those used in Spotlight® (a search facility on Macintosh® OS X from Apple® Inc.), described in U.S. Pat. No. 7,437,358, and in synchronization techniques for iCloud® from Apple® Inc. These techniques require timers to determine when a file operation has occurred on an edited document.

A typical example in which it is desirable to track a document is during a "safe save" operation in a file system of a data processing system. In a safe save, a user has an original document having an original filename, e.g. "foo", having an original file identifier, such as a POSIX file identifier. When a user edits the original document with an application program, the file system creates a temporary file from the original document called, e.g., "foo temp", and assigns a new file identifier to the temporary file. The new file identifier of the temporary file is different from the original file identifier of the original document. The user edits are then saved to the temporary file "foo temp", either automatically by the data processing system or upon user request. Once the temporary file is confirmed as having been successfully saved, then the file system renames the edited, temporary file from "foo temp" to "foo" over the original document. This process can be referred to as a safe save because the renaming of the edited, temporary file over of the original document occurs after confirming that the temporary file has been successfully, i.e. safely, saved. After a safe save, the edited temporary file gets the filename "foo" of the original document, but keeps the new file identifier and inode of the temporary file. Thus, it is difficult to track a document by its file identifier once the tracked document has been processed through a safe save, because the file identifier of the file having the filename of the original document can change during the safe save operation.

SUMMARY OF THE DESCRIPTION

In an embodiment, a document or a set of documents can be tracked through operations of a kernel in an operating system executing on a data processing system, such as a computer or tablet device or smartphone or other consumer electronic device. In one embodiment, one or more applications that run on the data processing system can opt in to having their user documents tracked by the kernel and file system. Each application can call the kernel (through an API) to specify that the application will opt in to document tracking, and thereby request the kernel and file system to track the application's documents stored in a file system on a non-volatile storage of the data processing system. Alternatively, an application may be treated by default as having opted in to document tracking without requiring an explicit opt in from the application.

In an embodiment, the kernel of an operating system can monitor processing threads of an application to determine whether a sequence of processing operations by the processing thread indicates that the processing thread is performing a safe save operation. In another embodiment, the kernel can monitor calls between the application and the file system. The kernel can then determine whether the file being safely saved by the processing thread is performing the safe save over a tracked document. If the kernel determines that the processing thread will safely save the file over a tracked document, and the next operation is a rename or delete operation, then the kernel can perform operations that will preserve a document identifier (DOCID) used to track the tracked document and ensure that the DOCID is associated with the file being saved over the tracked document. The DOCID can be a universally unique identifier (UUID). The UUID can be generated by the kernel, or obtained from a remote synchronization system. During a safe save operation, a file identifier, such as a POSIX file identifier, of the tracked document can change, while the DOCID of the tracked document remains associated with the edited version of the tracked document that is being safely saved over the tracked document having the DOCID.

In another embodiment, a system for tracking documents generated by applications that opt in to document tracking can "rollback" edits made to the tracked document. The kernel of an operating system can detect a sequence of processing operations by a thread that indicate that a safe save operation is being performed. An application that has opted in to document tracking can store a DOCID associated with the tracked document and can store additional metadata about the tracked document. During the safe save operation, the original version of the tracked document can be preserved and metadata related to the original version can be stored. The original version of the tracked document can be preserved by quitting its current location (path or inode), before the edited version of the tracked document is safely saved over the current location. The original version of the tracked document can quit its current location by, e.g., renaming away the original version of the tracked document to a backup or temporary location. In an embodiment, the DOCID and metadata associated with the original tracked document can be saved by the kernel in a tombstone record. In an embodiment, a mapping record can be stored in a database 250 that associates the original version of the tracked document with the edited version of the tracked document. The DOCID associated with original version of the tracked document can be transferred to the edited version of the tracked document that is being safely saved. The original version of the tracked document can be restored (edits "rolled back") by retrieving from the kernel the metadata associated with the original version of the tracked document and/or retrieving the mapping record that associates the original version tracked document and the edited version of the tracked document. The kernel can then cause the original version of the tracked document to be restored. In an embodiment, the edited version of the tracked document can be preserved after a rollback operations, in the event that a user wants to reinstate the rolled back edits.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
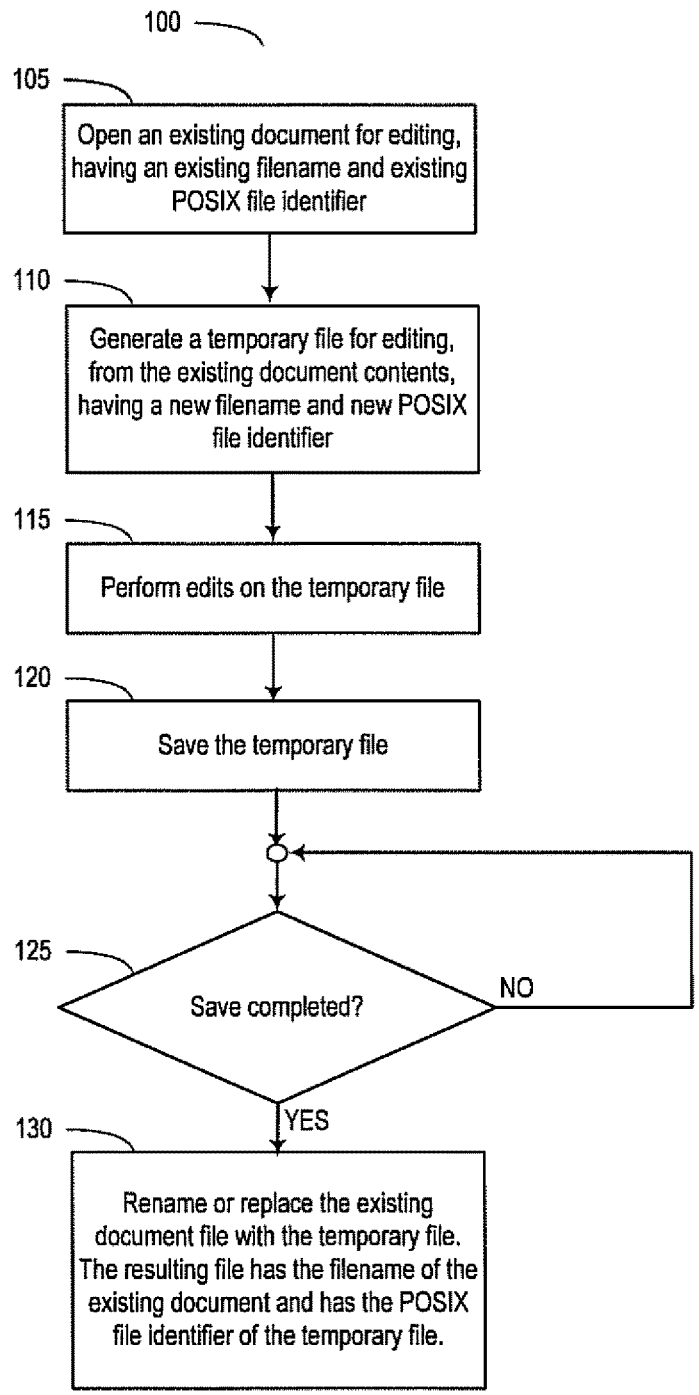
FIG. 1 illustrates a flow chart of a method of performing a "safe save" in the prior art.

FIG. 1 illustrates a flow chart of a method 100 of performing a "safe save" operation in the prior art. During a safe save, an operating system ensures that a temporary file containing edits to an existing document are confirmed as having been saved, before the temporary file is renamed over the existing document.

In operation 105, an existing document is opened for editing by an application. The existing document can have associated with it a filename and, in some file systems, an inode number and a file identifier, such as a POSIX file identifier.

In operation 110, a temporary file can be generated having the contents of the existing document. The temporary file typically has either a different filename, or is in a different directory, than the existing document. The temporary file and the existing document have different POSIX file identifiers.

In operation 115, edits can be made to the temporary file using the application. By making the edits to the temporary file, which is a copy of the existing document, the edits can be made without affecting the existing document until the temporary file is saved over the existing document.

In operation 120, the temporary file is saved to non-volatile storage, such as a disk, flash drive, or other storage medium. Saving of the temporary file may be triggered manually, such as by a user selecting a save item on a menu or clicking on a save icon on a user interface tool bar in the application being used to perform the edits. Alternatively, the temporary file may be saved automatically by the application based upon, e.g., expiration of an auto-save timer.

In operation 125, if it is determined that the temporary file has been successfully saved to non-volatile storage, then the method continues at operation 130. Otherwise, the method can re-check whether the temporary file has been saved in operation 125.

In operation 130, the saved temporary file is renamed over the existing document. In effect, the edited version of the existing document, which was saved in the temporary file in operation 120, replaces the existing document. During the rename process, the temporary file inherits the filename of the existing document. However, the temporary file will keep its own POSIX file identifier. The POSIX identifier associated with the existing document filename will be not be associated with the edited version of the existing document. Thus, a safe save in the prior art does not persist the POSIX file identifier of a document, making it very difficult to track a document in the prior art.

Figure 2:
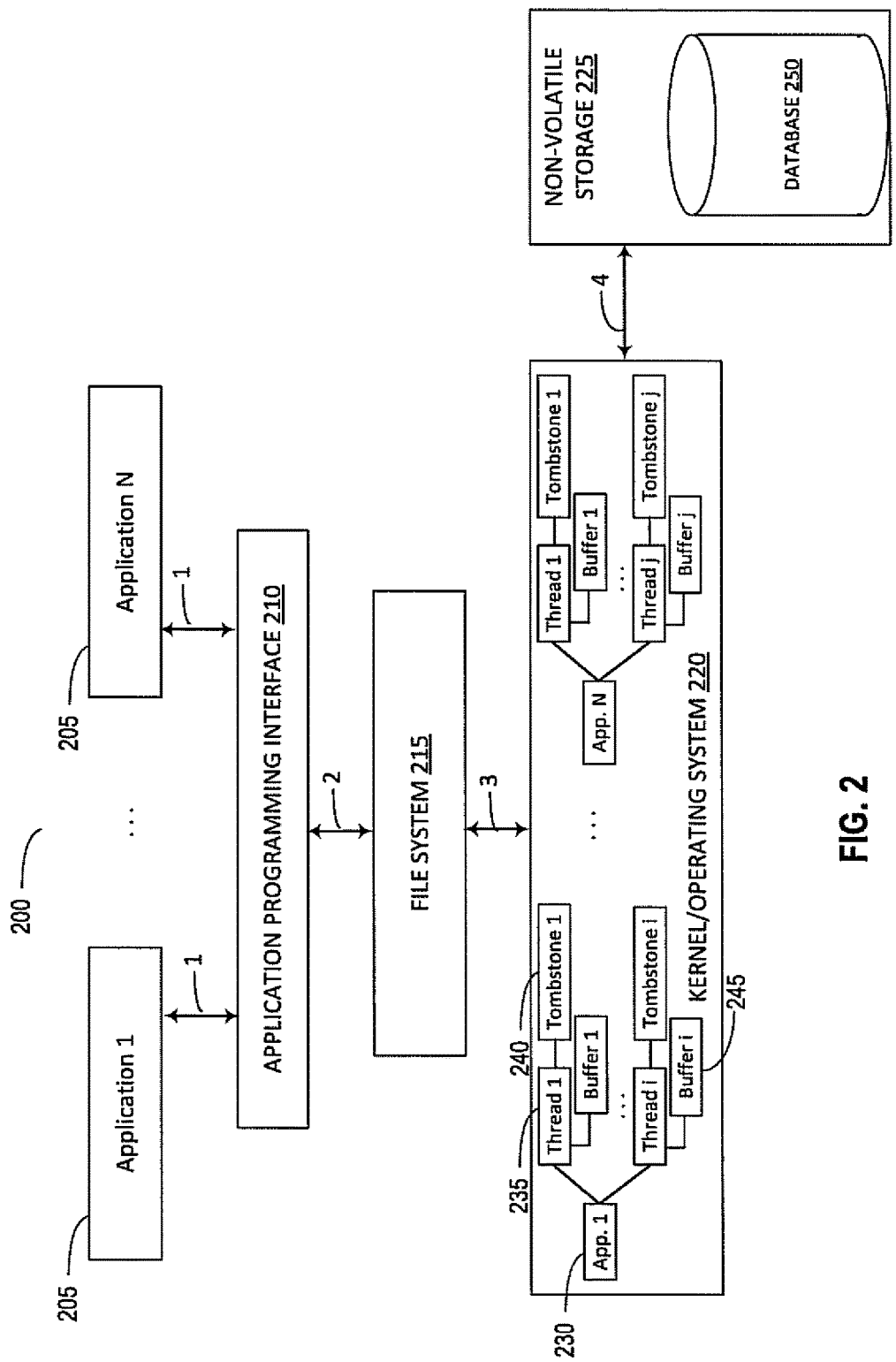
FIG. 2 illustrates a block diagram of a system for document tracking for use with some embodiments of the invention.

FIG. 2 illustrates a block diagram of a system 200 for document tracking for use with some embodiments of the invention.

The system 200 for tracking a document can comprise one or more applications 205, e.g. Application 1 through Application N, that can be interfaced to an application programming interface (API) 210 via communications interface 1. The API 210 can, in turn, be interfaced to a file system 215 via communication interface 2. The file system 215 can further be interfaced to a kernel 220 of an operating system via communication interface 3. The kernel 220 can communicate with a non-volatile store 225 via communication interface 4. In some embodiments, non-volatile storage 225 can comprise a database 250.

Communications interfaces 1 through 4 can be implemented using, for example, one or more application programming interface calls, system calls, inter-process communications, messaging, shared memory, sockets, or a bus.

Each application 205 can determine whether it will opt in to document tracking. An application 205 that opts in to document tracking can open a document by making an appropriate call to API 210 to the file system 215 to open the document. In an embodiment, the application 205 can set a flag indicating that the document is to be opened using document tracking. Such a flag can be set by the application 205, e.g., in a call to API 210. Alternatively, when application 205 starts up, application 205 can notify kernel 220 that application 205 opts in to document tracking.

Each application 205 can generate one or more processing threads. The kernel 220 can generate an application record 230 for each application 205 that is generating threads of processing activity. The kernel 220 can also generate a thread record 235 for each processing thread of an application 205 having a corresponding application record 230, e.g. for App. 1. One or more thread records 235, e.g. Thread 1 through Thread i, can be associated with an application record 230 for each application 205 running on the system 200. In an embodiment, the kernel 220 only generates an application record 230 and one or more thread records for applications 205 that opt in to document tracking.

The kernel 220 can track one or more processing operations performed by a processing thread of an application 205. Information identifying the processing operations can be stored in a buffer 245 associated with a processing thread of an application 205. The kernel 220 can link the thread processing operations buffer 245 with the thread processing record 230 for an application record 230 of the application 205. In an embodiment, the kernel 220 can monitor processing operations of a thread, stored within the buffer 245, to determine whether a sequence of processing operations indicate that a safe save is being performed by the thread. If the sequence of processing operations of a thread indicate that a safe save is being performed on a tracked document, then a "tombstone" 240 (or "safe save tombstone," in the attached Appendix) can be generated for the application 205, and processing thread, that is performing the safe save on the tracked document.

The kernel 220 can generate the tombstone 240 in response to file system 215 calls that rename or delete the tracked document during the safe save. Calls to or by file system that can trigger the generation of a tombstone during a safe save can include rename file, remove directory, remove file, unlink file. A tombstone 240 can be stored by the kernel 220 and associated with the thread record 235 of the thread performing the safe save. In an embodiment, a tombstone 240 can be a stored as a data structure containing metadata describing attributes of the tracked document involved in the safe save. The tombstone 240 can be used a temporary storage location for transferring metadata about a tracked document to a file being safely saved over the tracked document. The tombstone 240 can also be used, in some embodiments, to roll back changes made to the tracked document after a safe save of a file containing the changes over the existing tracked document.

A tombstone 240 can comprise metadata about the tracked document including, but not limited to, an inode identifier of the document, an inode identifier of a parent of the document, the filename of the document before the safe save of a temporary file over the document, the owner of the file, optionally including an access control list or other permission information, a date/time stamp of the creation of the tombstone, and a persistent document identifier (DOCID) such, as a universally unique identifier (UUID) for the document. In an embodiment, the DOCID can be a 128-bit universally unique identifier (UUID). In another embodiment, the DOCID can be a 32-bit identifier, as is found in some file systems, and additionally include padding bits, or bits that identify a disk volume on which the document resides, or both. In an embodiment, a tombstone 240 may additionally include a time-to-live value that determines when the tombstone 240 is destroyed. The time-to-live value can be, e.g., a time increment, an expiration date/time stamp, or an ordinal counter.

In an embodiment, the tombstone 240 for the existing document can be destroyed immediately following the successful completion of a renaming operation of a file over the existing document during a safe save. In an embodiment, a tombstone 240 for a tracked document can be retained for a period of time or until the happening of an event. This would allow an application 205 to request a "rollback" of the changes saved over the tracked document during the safe save. In an embodiment, a change rollback system can retain one or more tombstones 240 that were generated during a safe save operation. The tombstones 240 can be retained, or deleted, in accordance with a tombstone retention policy. A tombstone retention policy can balance the amount of storage required to retain previous versions of a tracked document, the amount of memory required to store the tombstones 240, and a setting, such as by a user or a system default, for how many history versions of a tracked document are to be retained.

In an embodiment, rather than using a tombstone retention policy, a tombstone 240 can store a time-to-live counter value, e.g. four (4) or five (5) safe-saves. On each safe save of the tracked document, the counter can be decremented until it reaches zero (0), then the tombstone 240 can be destroyed. In another embodiment, a tombstone 240 related to a particular thread can be destroyed by the happening of an event, such as the kernel 220 terminating the thread for which the tombstone 240 was created. When a tombstone 240 is destroyed, one or more garbage collection processes can recover resources used to store the tombstone 240.

Kernel 220 can be communicatively coupled to non-volatile storage 225. In response to calls from the file system 215, the kernel 220 can write data to, and read data from, non-volatile storage 225 via interface 4. Non-volatile storage 225 can include a database 250. In an embodiment, kernel 220 can write mapping records to, and read mapping records from, database 250. Mapping records can include storing a mapping of a DOCID to a file path and/or inode of the tracked document having the DOCID. Mapping records can further include storing a mapping of a DOCID to a POSIX file identifier of a document. In addition to the above mappings, a mapping record may additionally contain metadata about a file, a path, or the history of the mapping record. A history of a mapping record may include a data/time stamp that the mapping record was created, an identifier of the transaction that generated the mapping record, or a pointer to a journal record documenting the transaction that generated the mapping record, such as a rename or delete file operation during a safe save. Mapping records can help the kernel 220 determine whether a DOCID is currently in use and therefore whether the DOCID can be used for tracking a new document in the file system 215.

Figure 3:
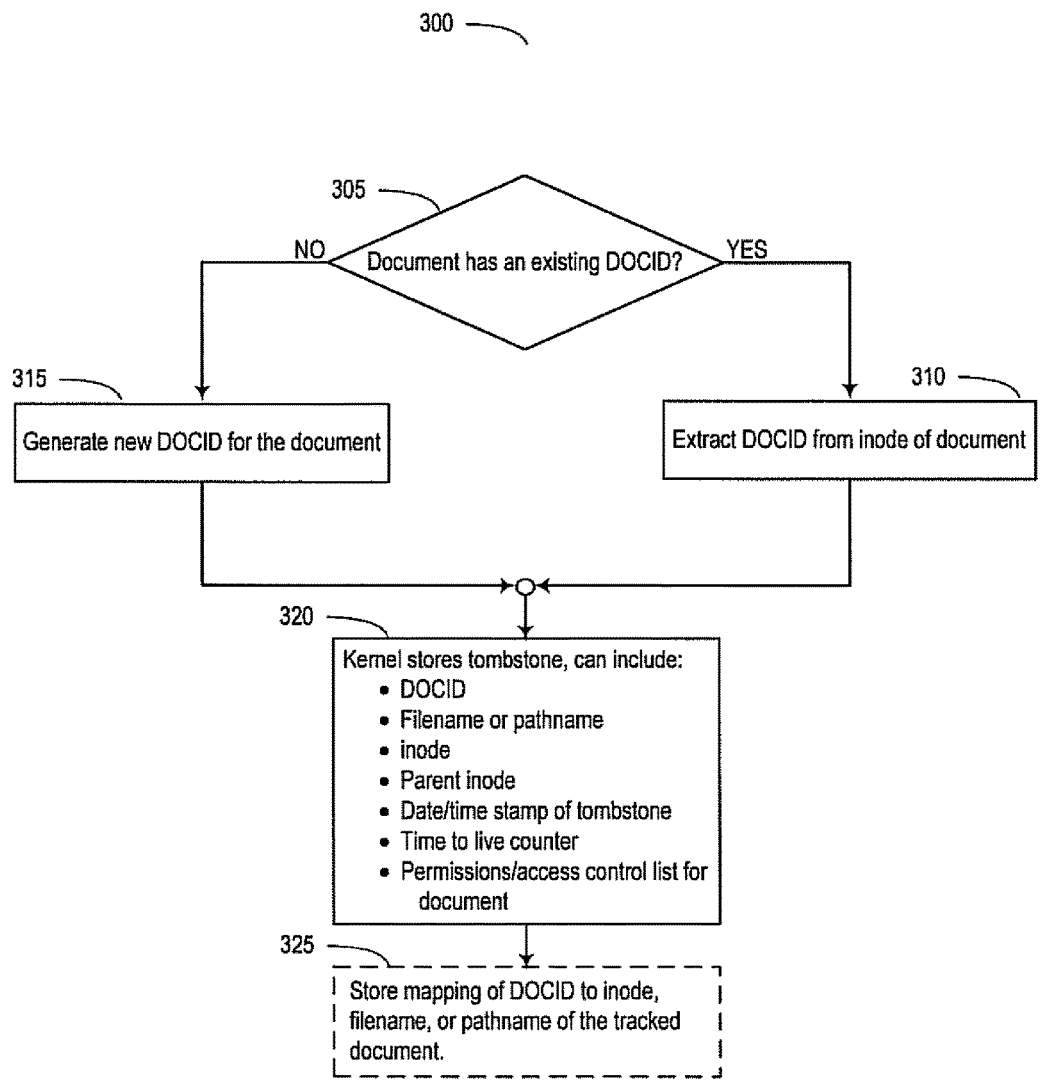
FIG. 3 illustrates a flow chart of a method of generating a tombstone for a tracked document according to some embodiments of the invention.

FIG. 3 illustrates a flow chart of a method 300 for kernel 220 to generate a tombstone 240 for a tracked document according to some embodiments of the invention. A tombstone 240 can be generated by the kernel 220 for a tracked document in preparation for a rename or delete operation, such as renaming a temporary file over the tracked document during a safe save operation, or deleting the tracked document during a safe save operation.

In operation 305, it is determined whether the tracked document already has a DOCID. A tracked document that has previously undergone a safe save may already have a DOCID. A tracked document can also be assigned a DOCID when the document is created by an application 205 that has opted in to document tracking. In an embodiment, the kernel 220 can examine the mapping records in database 250 to determine whether the tracked document has a DOCID. In another embodiment, the kernel 220 can access metadata stored in association with the tracked document to determine whether the tracked document already has a DOCID. In an embodiment, the metadata is stored in the inode of the tracked document.

If the tracked document already has a DOCID, then in operation 310, the DOCID can be obtained for the tracked document. In an embodiment, the DOCID can be obtained from metadata stored in association with the tracked document. The metadata can be stored in a data structure within the inode of the tracked document. The DOCID can alternatively be obtained from the mapping records in database 250 by looking up the filename, pathname or inode of the tracked document and obtaining the associated DOCID from the mapping record. In an embodiment, the DOCID can be obtained from a remote synchronization service that synchronizes one or more files across multiple devices. The DOCID can be a universally unique identifier (UUID) that is unique within the local file system, and may be unique across file systems of all devices that participate in a synchronization.

If the tracked document does not already have a DOCID, then in operation 315 the kernel 220 can generate a DOCID for the tracked document. In an embodiment, the kernel 220 can generate a random DOCID and use the mapping records in database 250 to determine whether a DOCID generated by the kernel 220 is already in use. In another embodiment, the kernel 220 can maintain a variable, e.g., the last highest assigned DOCID value, and can generate a new DOCID by incrementing the variable, using the new DOCID value, then storing the incremented value as the new, last highest assigned DOCID value. In an embodiment, the kernel 220 can generate a mapping record of the new DOCID and tracked document filename, pathname, or inode, and store the mapping record in the database 250.

In operation 320, the kernel 220 can generate a tombstone 240 for the tracked document. The tombstone 240 can include metadata about the tracked document including, e.g., the DOCID of the tracked document, the filename, directory pathname, or inode of the tracked document, a prior filename of the tracked document, the parent node of the inode of the tracked document, a date/time stamp of when the tombstone was generated, a time-to-live counter, and permissions or an access control list (ACL) for the tracked document. The kernel 220 can associate the tombstone 240 with a thread record 235 of the processing thread of the application 205 that invoked the method 300 of generating a tombstone.

In operation 325, the kernel 220 can optionally store a mapping record in database 250 that maps the DOCID of the tracked document to the pathname, filename, inode, or other metadata of the tracked document. In an embodiment, the kernel 220 can generate tombstone 240 and perform a transfer of the some or all of the tombstone 240 metadata to a file, or inode of a file, being renamed over the tracked document as part of an atomic operation, rather than storing the tombstone 240 or linking the tombstone 240 to the thread record 235.

Figure 4:
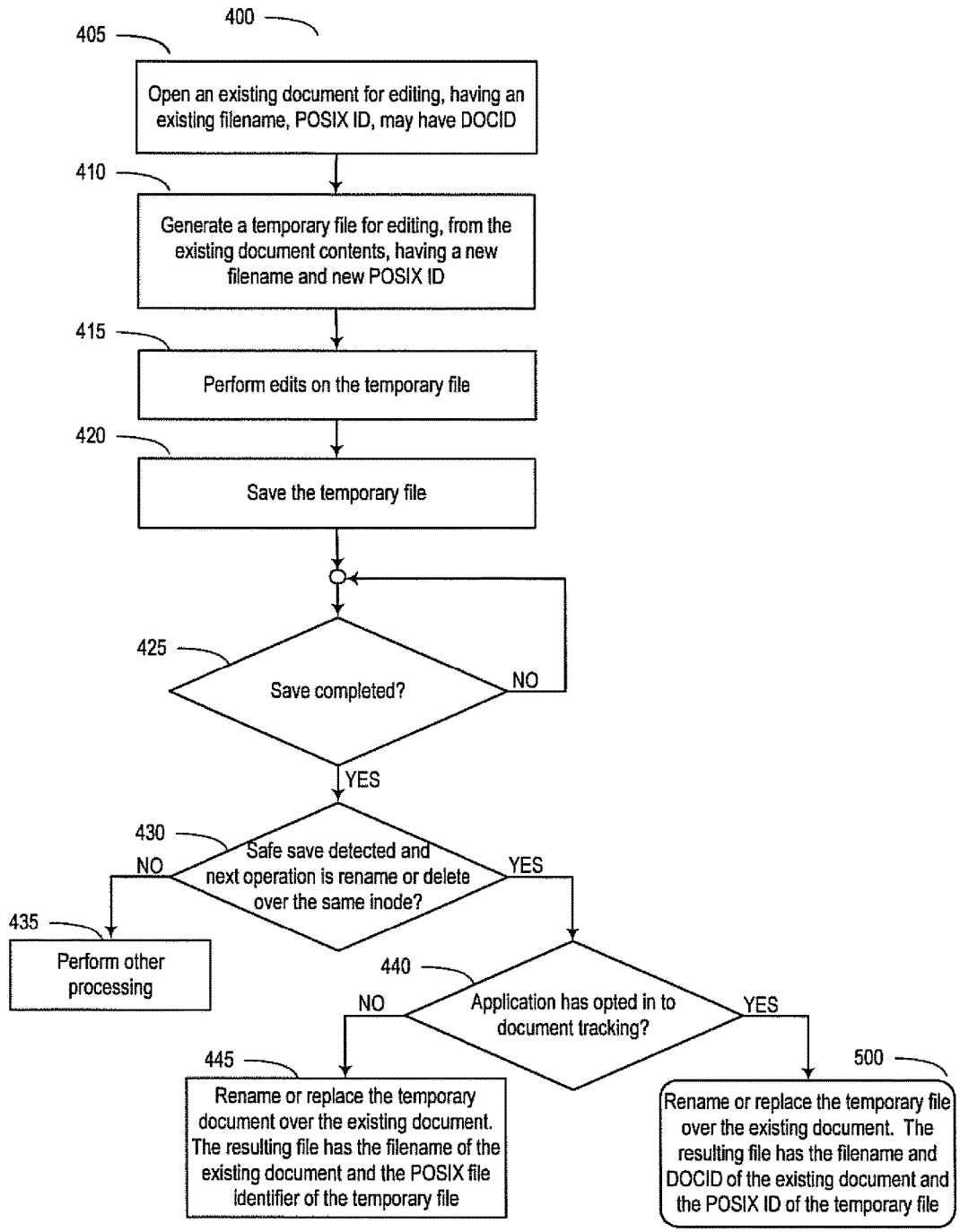
FIG. 4 illustrates a flow chart of a method for performing a safe save on a tracked document according to some embodiments of the invention.

FIG. 4 illustrates a flow chart of a method 400 for performing a safe save on a tracked document according to some embodiments of the invention. A safe save may be performed after editing an existing tracked document, as a part of saving the edits over the tracked document.

In operation 405, an application 205 can open an existing document for editing. The existing document can have an existing filename, an existing inode, a parent inode of the existing inode, a POSIX file identifier, and other metadata. The existing document may additionally have a DOCID associated with the existing file. The DOCID may have been associated with the existing document as a consequence of the application 205 having opted in to document tracking and the application having previously edited the document. In an embodiment, the existing document may not yet have a DOCID, in which case a DOCID can be generated in a method, such as the method of FIG. 3.

In operation 410, a temporary file can be generated, in which the application 205 can perform edits to a copy of the existing document. The application 205 can call appropriate file system 215 operations to generate the temporary file and to populate the temporary file with the contents of the existing document. The temporary file is, essentially, a copy of the existing document to which edits can be made without affecting the existing document. Then the temporary file can be safely saved over the existing document. The temporary file can have a different filename than the existing document, or the same filename and a different path or a different non-volatile storage 225 volume than the existing document. The temporary file can also have a POSIX file identifier. If the temporary file is on the same file system as the existing document, then the POSIX identifier of the temporary file will be different than the POSIX identifier of the existing document.

In operation 415, edits can be performed on the temporary file using the application 205.

In operation 420, the temporary file can be saved. The save may be triggered automatically, such as by a expiration of a backup frequency timer, or the save may be triggered manually, such as by a user selecting a "Save" item from a menu or clicking on a "Save" icon on a toolbar in a user interface of the application 205.

In operation 425, it is determined whether the temporary file has been successfully saved to non-volatile storage 225. The operation 425 can loop until the save operation is complete, or a re-check can be performed incrementally, until it is determined that the temporary file has successfully been saved to non-volatile storage 225.

In operation 430, the kernel 220 can determine whether it has detected a safe save in progress and whether the next operation is a rename or delete operation over the inode of the existing document at the same path or parent inode as the existing document. The kernel 220 can monitor processing activities of a processing thread of an application 205 and determine whether a sequence of processing activities in the processing thread indicates that the thread is performing a safe save operation, and whether the next operation is a rename or delete operation.

If, in operation 430, the kernel 220 detects that a processing thread is not performing a safe save operation, or the next operation is not a rename or delete operation over the same inode as the existing document, then in operation 435 the processing thread can perform other appropriate processing activities. For example, if the sequence of processing operations for the thread indicates that the processing thread is performing a save of a new file for the first time, then an appropriate processing activity after confirming a save of the temporary file can be renaming the temporary file to a filename entered by a user.

If, in operation 430, the kernel 220 determines that the processing thread is performing a safe save, the in operation 440, it is determined whether the application 205 that generated the processing thread performing the safe save has opted in to document tracking.

If, in operation 440, it is determined that the application 205 has a not opted in to document tracking, then in operation 445 the temporary file can be renamed over the existing document. The resulting file will have the filename of the existing document and the POSIX file identifier of the temporary file that is being renamed over the existing document.

If, in operation 440, it is determined that the application 205 has opted in to document tracking, then operation 500 can be performed to complete the safe save operation for a tracked document. Operation 500 is described below with reference to FIG. 5.

Figure 5:
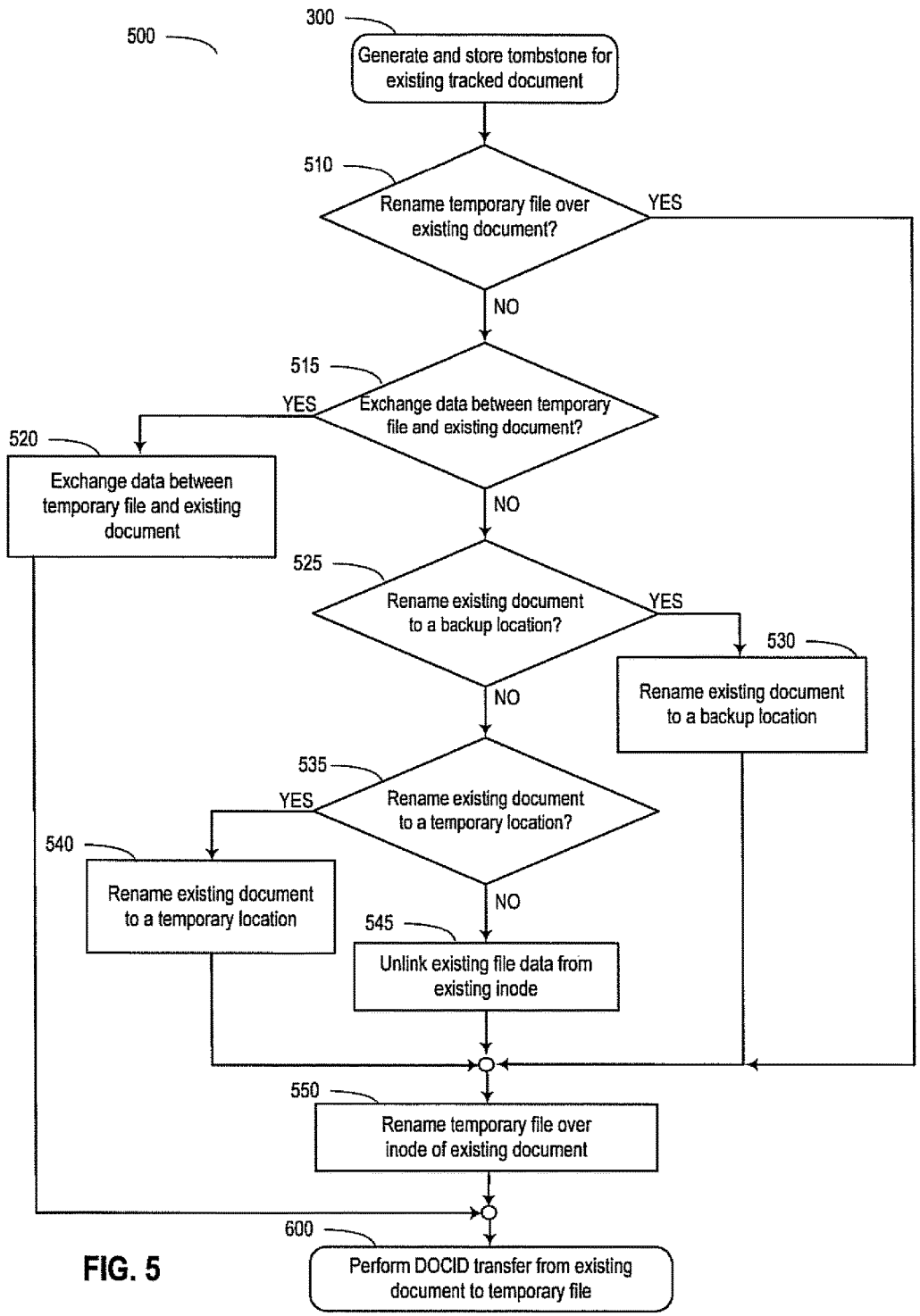
FIG. 5 illustrates a flow chart of a method for tracking a document during a rename or delete operation while performing a safe save of a tracked document according to some embodiments of the invention.

FIG. 5 illustrates a flow chart of a method 500 for tracking a document during a renaming operation while performing a safe save of the document according to some embodiments of the invention. A renaming operation over an existing file can be performed using several different embodiments described below. In some embodiments, the operations can be performed atomically.

Within the following description of FIG. 5, the term "existing inode" refers to the inode of the existing document. The term "new inode" refers to the inode of the temporary file in which edits have been made and which will be safely saved over the existing document.

In operation 300, a tombstone 240 can be generated for the existing document, as described above with reference to FIG. 3.

In operation 510, it is determined whether the temporary file at the new inode should be renamed over the existing document at the existing inode. In an embodiment, the determination can be made by the kernel 220 detecting that the file system 215 has received a system call to rename the temporary file over the existing document. If it is determined that the temporary file should be renamed over the existing document, then in operation 550 the kernel 220 can cause renaming of the temporary file at the new inode over the existing document at the existing inode. In an embodiment, renaming the temporary file over the existing document can be performed atomically. In an embodiment, operation 550 can be a journaled operation.

If, in operation 510, it was determined that the temporary file at the new inode should not be renamed over the existing document, then in operation 515 it can be determined whether there should be an exchange of data between the temporary file at the new inode and the existing document file at the existing inode. In an embodiment, the determination can be made by the kernel 220 detecting that the file system 215 has received a system call to exchange data between the temporary file and the existing document. If it is determined that the temporary file and the existing document should exchange data, then in operation 520, the kernel 220 can cause a data exchange between the temporary file at the new inode and the existing document at the existing inode. In an embodiment, the data exchange can be performed atomically. In an embodiment, operation 520 can be a journaled operation.

If, in operation 515, it was determined that an exchange of data between the temporary file at the new inode and the existing document at the existing inode should not take place, then in operation 525 it can be determined whether the existing document should be renamed to a backup location. In an embodiment, the determination can be made by the kernel 220 detecting that the file system 215 has received a system call to rename the existing document to a backup location. If it is determined that the existing document should be renamed to a backup location, then in operation 530, the kernel 220 can cause renaming of the existing document at the existing inode to a backup location, and in operation 550 the kernel 220 can cause renaming of the temporary file at the new inode over the existing inode. In an embodiment, operations 530 and 550 can be performed atomically. In an embodiment, operations 530 and 550 can be journaled operations.

If, in operation 525, it was determined that the existing document should not be renamed to a backup location, then in operation 535 it can determined whether the existing document should be renamed to a temporary location. In an embodiment, the determination can be made by the kernel 220 detecting that the file system 215 has received a system call to rename the existing document to a temporary location. If it is determined that the existing document should be renamed to a temporary location, then in operation 540, the kernel 220 can cause renaming of the existing document to a temporary location, and in operation 550 the kernel 220 can cause renaming of the temporary file at the new inode over the existing inode. In an embodiment, operations 540 and 550 can be performed atomically. In an embodiment, operations 540 and 550 can be journaled operations.

If, in operation 535, it was determined that the existing document should not be renamed to a temporary location, then in operation 545 the existing document file can be unlinked from the existing inode, and in operation 550 the kernel 220 can cause renaming of the temporary file over the inode of the existing document. In an embodiment, operations 545 and 550 can be performed atomically. In an embodiment, operations 545 and 550 can be journaled operations.

In operation 600, a transfer of the DOCID, an optionally additional file metadata, of the existing tracked document can be performed in accordance with the operations described with reference to FIG. 6.

Figure 6:
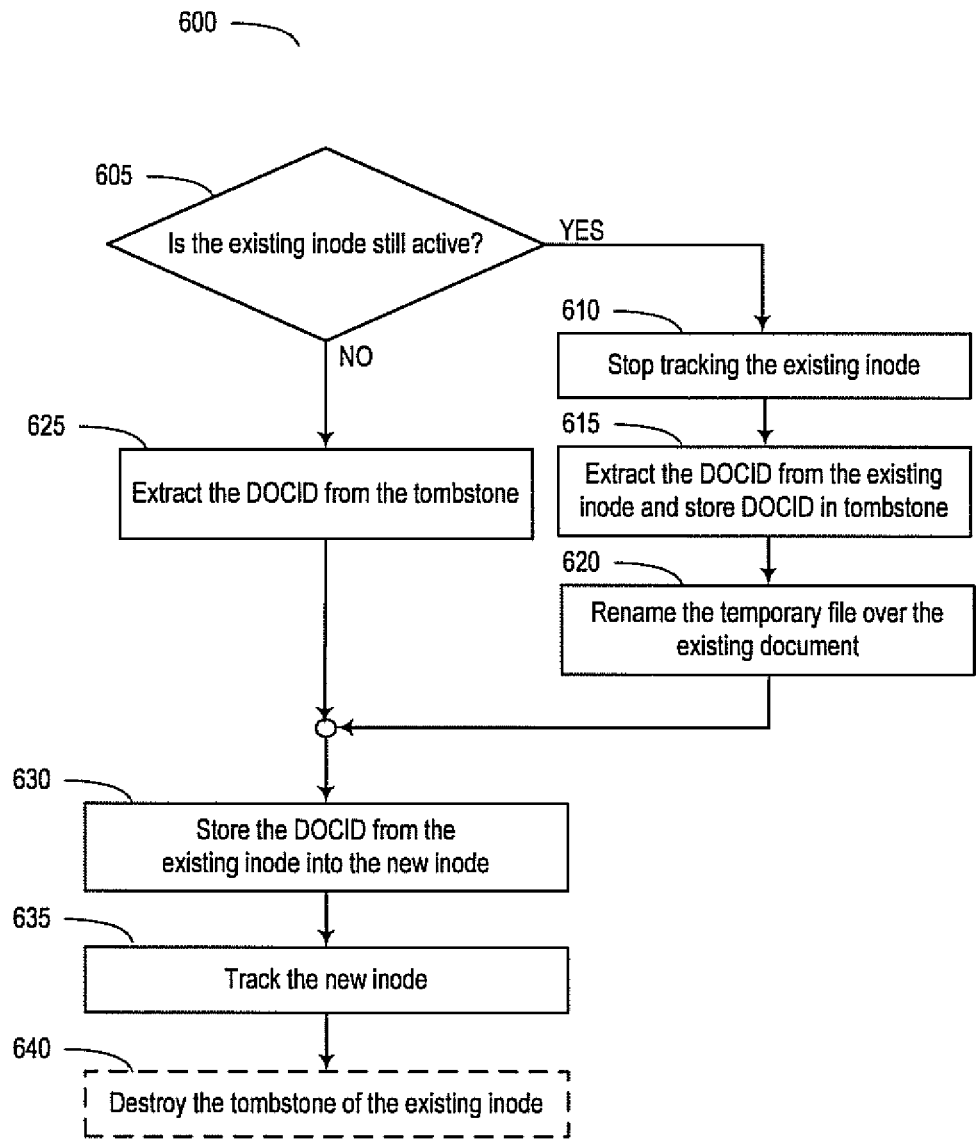
FIG. 6 illustrates a flow chart of a method of transferring a document identifier (DOCID) of an existing tracked document to an edited version of the tracked document during a safe save, according to some embodiments of the invention.

FIG. 6 illustrates a flow chart of a method 600 for transfer of a DOCID for a tracked document according to some embodiments of the invention. During a safe save operation, the DOCID of the tracked document can be transferred to the temporary file that contains edits to the tracked document. The actual transfer can happen before, or after, renaming of the temporary file over the existing tracked document. In either case, the transfer of the DOCID can occur atomically with the renaming of the temporary file over the existing tracked document file. For purposes of the description of FIG. 6, the term "existing inode" refers to the inode of the tracked document prior to the temporary file being renamed over the tracked document during a safe save. The term "new inode" refers to the inode of the temporary file containing edits to the tracked document.

In operation 605, it can be determined whether the existing inode is still active. The existing inode can still be active if the renaming of the temporary file over the existing tracked document has not yet occurred. The existing inode can also be active the temporary file and existing document are to exchange data as a part of a renaming operation as described with reference to FIG. 5.

If the existing inode is still active, then in operation 610 document tracking can be stopped for the existing inode. In operation 615, the DOCID of the existing tracked document can be obtained from the tombstone 240 of the tracked document. The DOCID can alternatively be obtained from metadata stored in association with the existing inode. Obtaining the DOCID from the tombstone 240 may be substantially faster since the kernel 220 obtains the DOCID from the tombstone 240 within the kernel 220 itself, rather than accessing the existing inode in non-volatile storage 225. In an embodiment, the non-volatile storage 225 can be cached and the DOCID can be obtained from the metadata associated with the existing inode of the tracked document via the cache of the non-volatile storage 225. In operation 620, the temporary file at the new inode can be renamed over the existing tracked document at the existing inode.

If, in operation 605, it was determined that the existing inode is not still active, then the DOCID of the tracked document can be obtained from the tombstone 240 within the kernel 220.

In operation 630, the DOCID of the tracked document can be stored in the new inode and tracking of the new inode can begin in operation 635.

In operation 640, at the completion of the atomic transfer of the DOCID from the existing inode to the new inode, and the end of the safe save process, the kernel 220 can optionally destroy the tombstone 240. As described above, tombstone 240 can be retained to implement a "rollback" of the edits made to the existing document that would otherwise be lost as a consequence of the safe save. See the description of FIG. 8, below, regarding implementation of a method for restoring a previous version ("rollback") of a tracked document.

Figure 7:
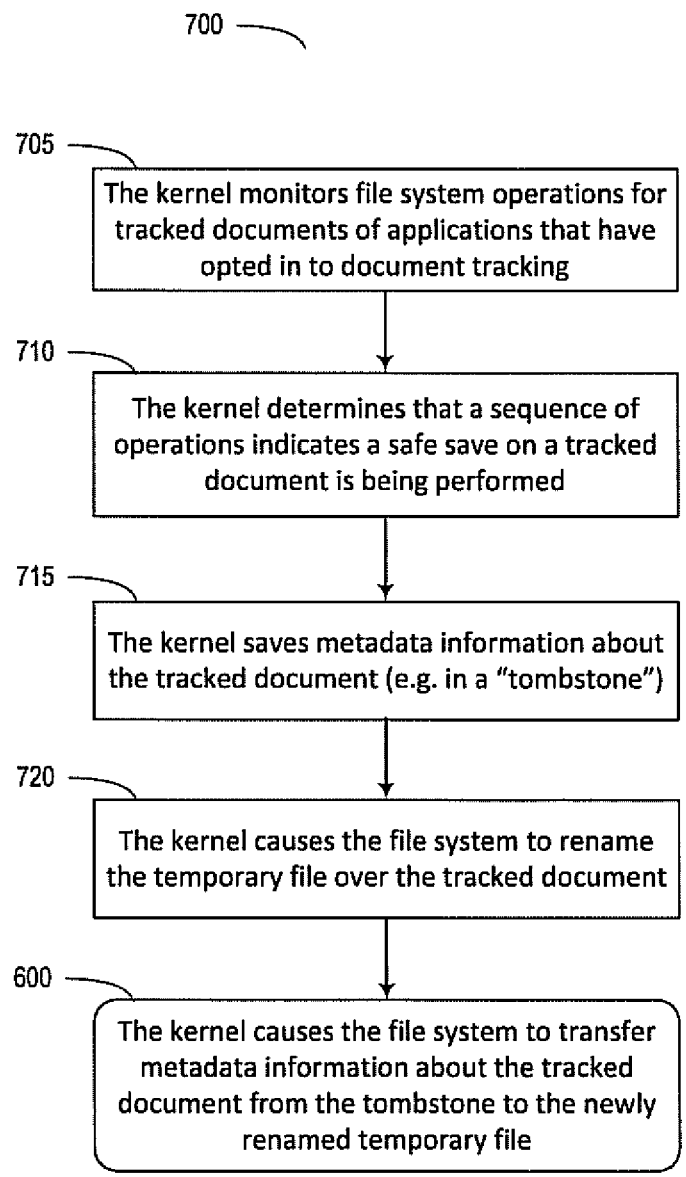
FIG. 7 illustrates a flow chart of operations performed by an operating system kernel during a safe save of a tracked document according to some embodiments of the invention.

FIG. 7 illustrates a flow chart of a high-level view of operations 700 that can be performed by an operating system kernel 220 during a safe save of a tracked document according to some embodiments of the invention. No timers are needed to track the document during the safe save operations.

In operation 705, the kernel 220 can monitor file system operations. File system operations can be monitored for each processing thread of an application 205. The kernel 220 can maintain a buffer 245 of processing activities of each processing thread. In an embodiment, the activities stored in the buffer 245 can be stored in an order that defines a sequence of processing activities.

In operation 710, the kernel 220 can determine that a sequence of operations indicates that a safe save is in process of being performed. In an embodiment, the kernel 220 can examine the buffer 245 for processing thread of an application 205 to determine whether a sequence of operations indicates that a safe save is being performed. In an embodiment, the kernel 220 can implement a finite state machine to determine whether a sequence of processing operations indicates that a safe save is being performed. A safe save operation can include a file rename or delete operation.

In operation 715, the kernel 220 can save metadata associated with the tracked document. In an embodiment, the kernel 220 can generate a tombstone 240 in response to detecting that a sequence of processing activities for a thread indicates that a safe save is being performed by the thread. The tombstone 240 can be stored within the kernel 220.

In operation 720, the kernel 220 can cause the file system 215 to rename the temporary file over the existing tracked document within the file system 215.

In operation 600, the kernel 220 can cause the file system 215 to transfer metadata about the tracked document from the tombstone 240 to the temporary file that was renamed over the existing document in operation 720. An embodiment of operation 600 is described above with reference to FIG. 6.

FIG. 8 illustrates a flow chart of a method 800 for rolling back a revision of a tracked document according to some embodiments of the invention. The changes to an existing document may be rolled back in embodiments wherein the contents of the existing document are not deleted or lost during the renaming operation, such as during data exchange between the temporary file and existing tracked document, or when the existing tracked document quits its current location before the temporary file is renamed over the inode of the existing document. In such embodiments, the tombstone 240 may further include metadata indicating the inode where the data of the existing document may be found. The tombstone 240 may further include data indicating the type of rename operation that was performed to rename the temporary file over the existing document, so that the kernel can determine whether a rollback can be performed. Alternatively, the kernel 220 can determine whether a rollback can be performed by examining the inode field that should indicate where the data of the existing document can be found. If the inode field is invalid, such as a value of negative one (−1), then the kernel 220 can determine that the rollback cannot be performed.

Figure 8A:
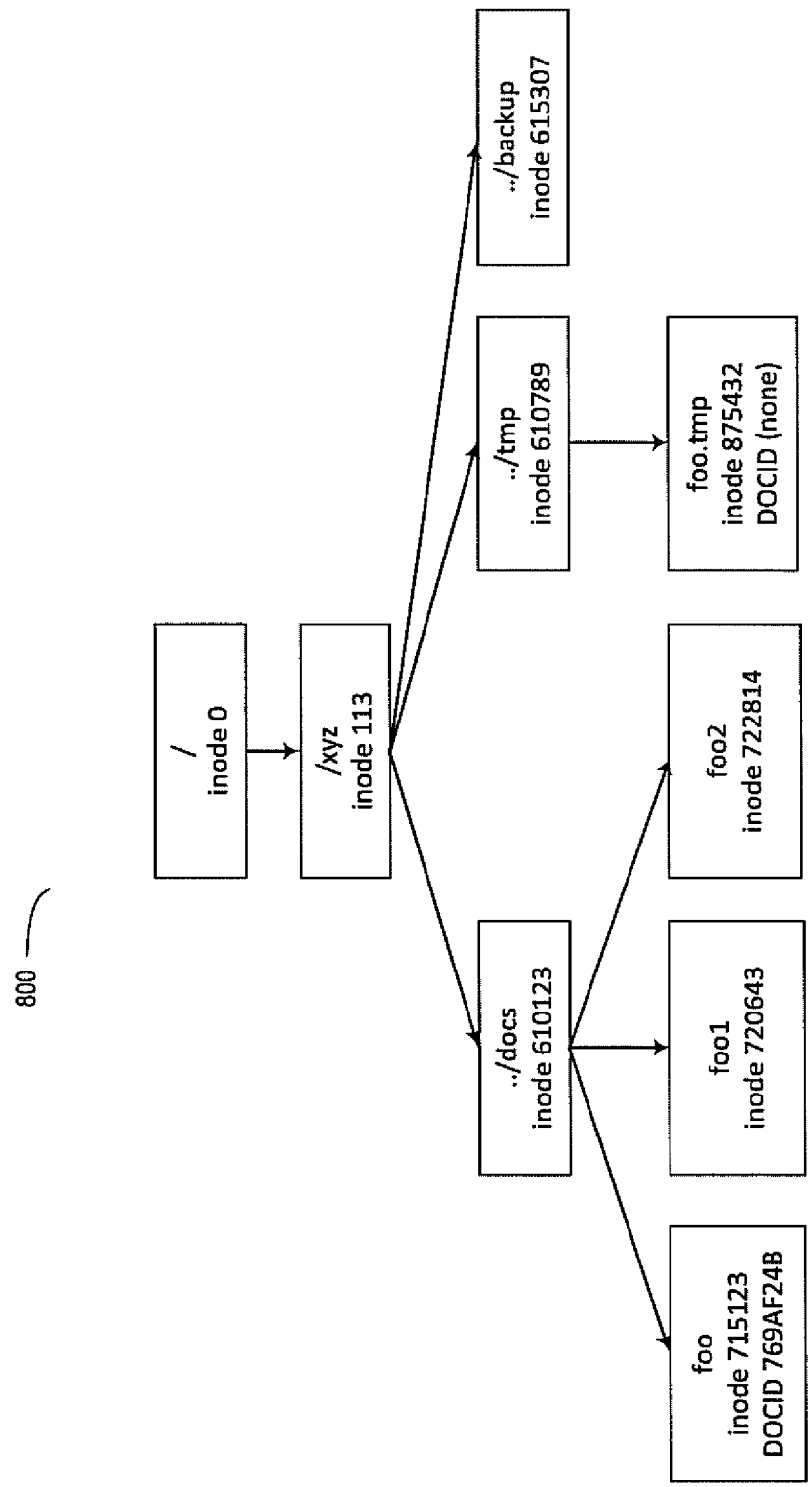
FIG. 8A illustrates an exemplary directory structure of a file system, before a rename operation of a safe save, in some embodiments of the invention.

FIG. 8A illustrates an exemplary directory structure 800 of a file system, before a rename operation in some embodiments of the invention. In the directory structure 800, the inode data structure of a root directory "/" can be pointed to by inode number 0. The inode data structure for the root directory "/" can point to one or more data blocks comprising a directory file that lists all files and directories, and their respective inode numbers, related to the root directory "/". One such directory can be the directory "../xyz," having inode number 113.

The inode data structure for the inode number 113 for the "../xyz" directory can similarly point to a directory file that lists all files and directories, and their respective inode numbers, related to the directory "../xyz". The directory file can contain entries for, e.g., a "../docs" directory, a "../tmp" directory, and a "../backup" directory, having inode numbers 610123, 610789, and 615307 respectively. Each inode number can point to an inode data structure for the respective directory.

The inode data structure pointed to by inode number 610123 for directory "../docs" can point to a directory file that lists all files and directories, and their respective inode numbers, within the directory "../docs." For example a file named "foo" having inode number 715123 can be included within the directory file pointed to by the inode data structure having inode number 610123. The inode data structure pointed to by inode number 715123 can point to the data blocks comprising the file "foo". The inode data structure pointed to by inode number 715123 can also include an entry for a DOCID 769AF24B for the file named "foo", with "foo" being a tracked document. The directory file for the directory "../docs" may also include entries for files "foo1", having inode number 720643, and "foo2" having inode number 722814.

The inode data structure pointed to by inode number 610789 for directory "../tmp" can include a pointer to a directory file that lists all files and directories within the directory "../tmp", and their corresponding inode numbers. For example, the directory file may contain an entry for a file named "foo.tmp" having inode number 875432. In the example, the file "foo.tmp" is not a tracked document and therefore has no DOCID associated with the file.

Figure 8B:
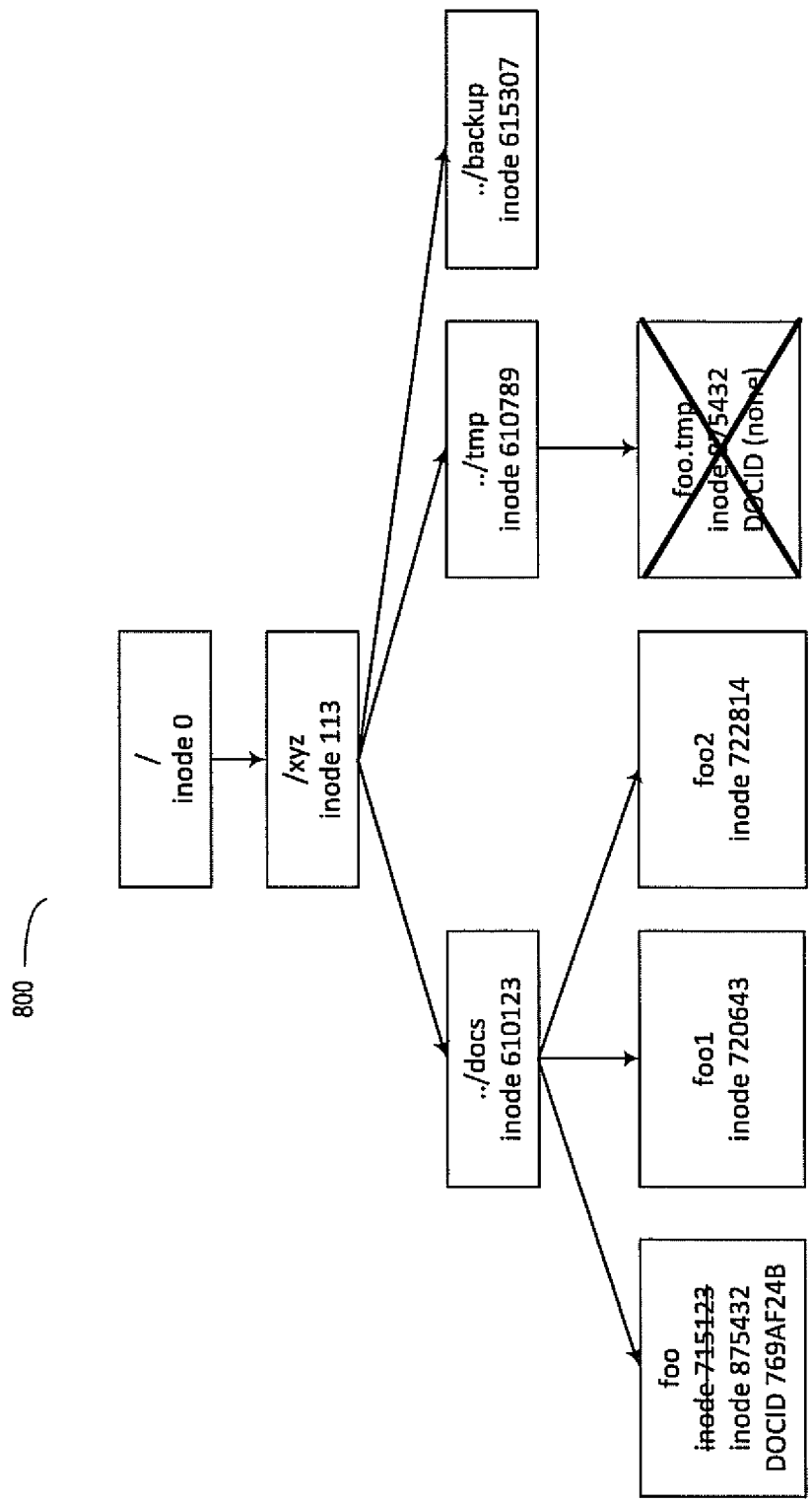
FIG. 8B illustrates an exemplary directory structure of a file system, after a rename and replace operation, in some embodiments of the invention.

FIG. 8B illustrates an exemplary directory structure 800 of a file system, after a rename and replace operation, according to some embodiments of the invention. In the following description of FIG. 8B, file "foo" can represent an existing tracked document and file "foo.tmp" can represent an edited version of "foo." A user can perform a safe save of "foo.tmp" to save the edits made to "foo" using an application 205 that has opted in to document tracking.

A user can perform a safe save, as described above with respect to FIG. 4 through FIG. 7, above. FIG. 6 illustrates several different embodiments that are part of a safe save operation, including an embodiment wherein the temporary file is renamed over the existing tracked document, an embodiment wherein the temporary file and existing tracked document exchange data, and an embodiment wherein the existing tracked document is renamed away to a backup location before renaming the temporary file over the existing tracked document.

FIG. 8B illustrates an embodiment wherein the temporary file, "foo.tmp," is being renamed over the existing document, "foo." As described above, the parent directory of "foo" is "../docs". The directory file for the directory "../docs" can contain entries for all files and directories associated with the directory "../docs" and their respective inode numbers. In this example, within the directory file for the directory "../docs," there is an entry for the filename "foo" having inode number 715123. During the safe save renaming operation, in the directory file for the directory "../docs", the kernel 220 can change the inode number of "foo" from 715123 to 875432 (the inode number of "foo.tmp"). The kernel 220 can also generate a tombstone 240 for the existing tracked document, "foo." The kernel 220 can store the DOCID, POSIX file identifier, inode number, parent inode number, and other metadata for the existing tracked document "foo' in the tombstone 240. In response to detecting a safe save by the kernel 220, and detecting that the next operation is a rename or delete operation over the inode 715123 of the existing tracked document, the kernel 220 can then read the DOCID from the tombstone 240 for the file "foo" and transfer the DOCID for the file "foo" to the inode data structure for inode number 875432. The directory file for directory "../tmp" can be updated to delete the filename and inode reference for "foo.tmp." The inode data structure for inode number 715123 can be destroyed and the tombstone 240 can be destroyed. Data blocks pointed to by the inode data structure for inode number 715123 can be recovered by the file system 215.

Figure 8C:
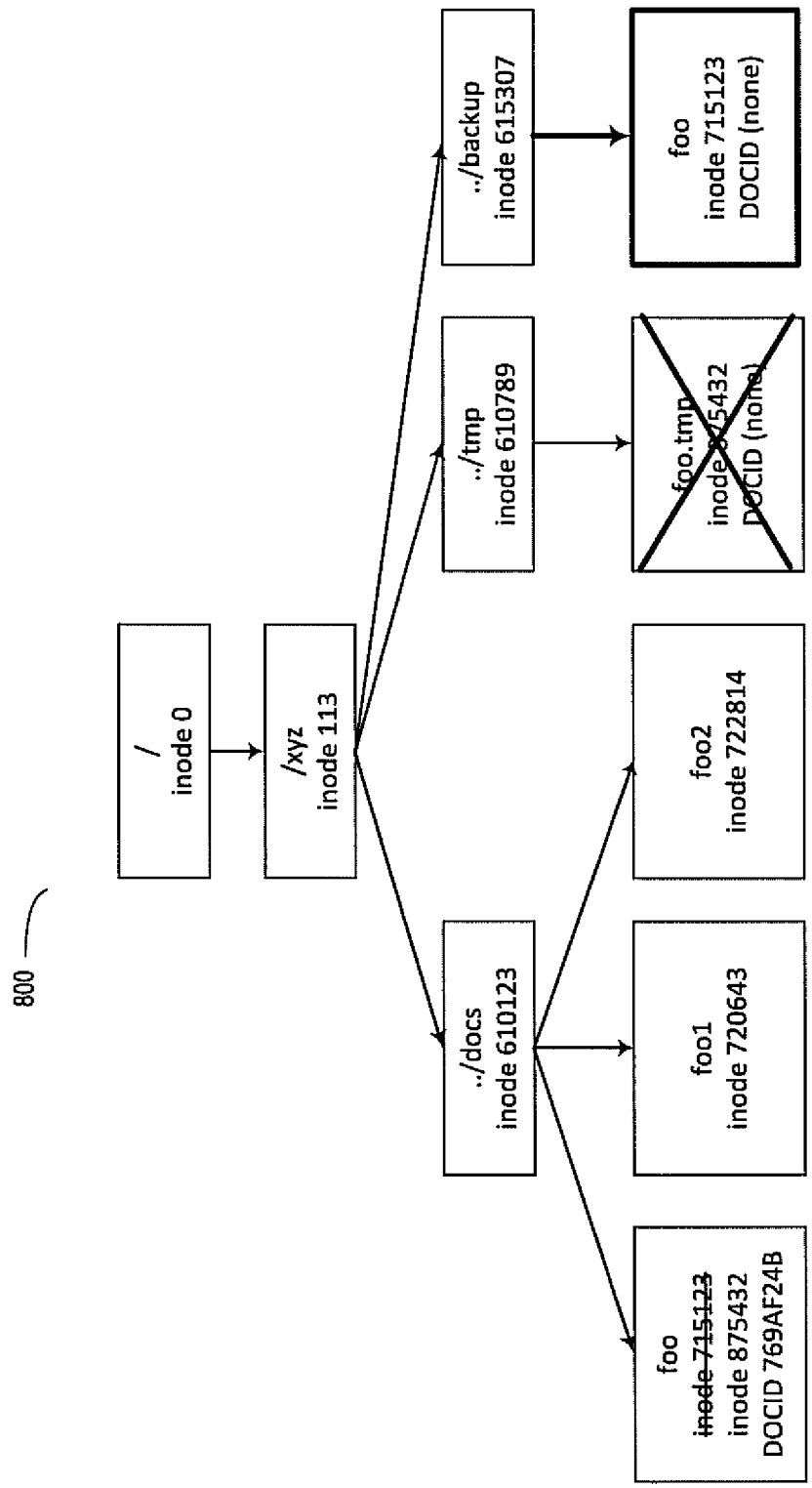
FIG. 8C illustrates an exemplary directory structure of a file system, after a rename operation of an existing tracked document to a backup directory and a rename operation of a temporary file to the previous location of the existing tracked document, in some embodiments of the invention.

FIG. 8C illustrates an exemplary directory structure 800 of a file system, after renaming an existing tracked document to a backup location and renaming a temporary file over the inode of the existing tracked document, according to some embodiments. FIG. 9C illustrates an embodiment wherein the original tracked document "foo" quits its location before the renaming of the temporary file to the existing tracked document's location in the file system 215 directory structure. In an embodiment, the tracked document "foo" could alternatively be renamed away to a temporary location (not shown). Then the temporary file containing the edited version of the existing tracked document can be renamed to the location that the original tracked document has quit.

In preparation for the rename operation, the kernel 220 can generate a tombstone 240 for the existing tracked document, "foo." The kernel 220 can store the DOCID, POSIX file identifier, inode number, parent inode number, and other metadata for "foo" in the tombstone 240 as described with reference to FIG. 3.

The file "foo" can then be renamed away to, e.g., the backup directory "../backup." The backup directory "../backup" can have a directory file listing all of the files and directories related to the directory "../backup", and their respective inode numbers. For example, the directory file can have an entry for the backup directory itself, "../backup", the parent directory of the backup directory, "./", and their respective inodes. Upon renaming "foo" to the backup directory, a new entry can be added to the directory file for the directory "../backup." The entry can list the file "foo" with inode number 715432, the inode of the original tracked document before editing.

Next, the temporary file "foo.tmp" can be renamed to the directory "../docs" by updating the directory file for the directory "../docs." Before renaming "foo" to the "../backups" directory, the directory file for the "../docs" directory had an entry for "foo" with inode number 715123. To rename "foo.tmp" in the "../tmp" directory to "foo" in the "../docs" directory, the inode number for the "foo" entry in the "../docs" directory file can be changed to 875432, the inode of the "foo.tmp" file. The DOCID, file permissions, access control list and other meta data related to the original tracked document "foo" can be read from the tombstone 240 and transferred to the inode data structure 875432, except the POSIX file identifier. The newly renamed file "foo" inherits the POSIX identifier of the file "foo.tmp."

Finally, the directory file for the directory "../tmp" can be updated by deleting the line item in the "../tmp" directory file that references "foo.tmp" and inode 875432. The tombstone 240 can be destroyed.

Figure 8D:
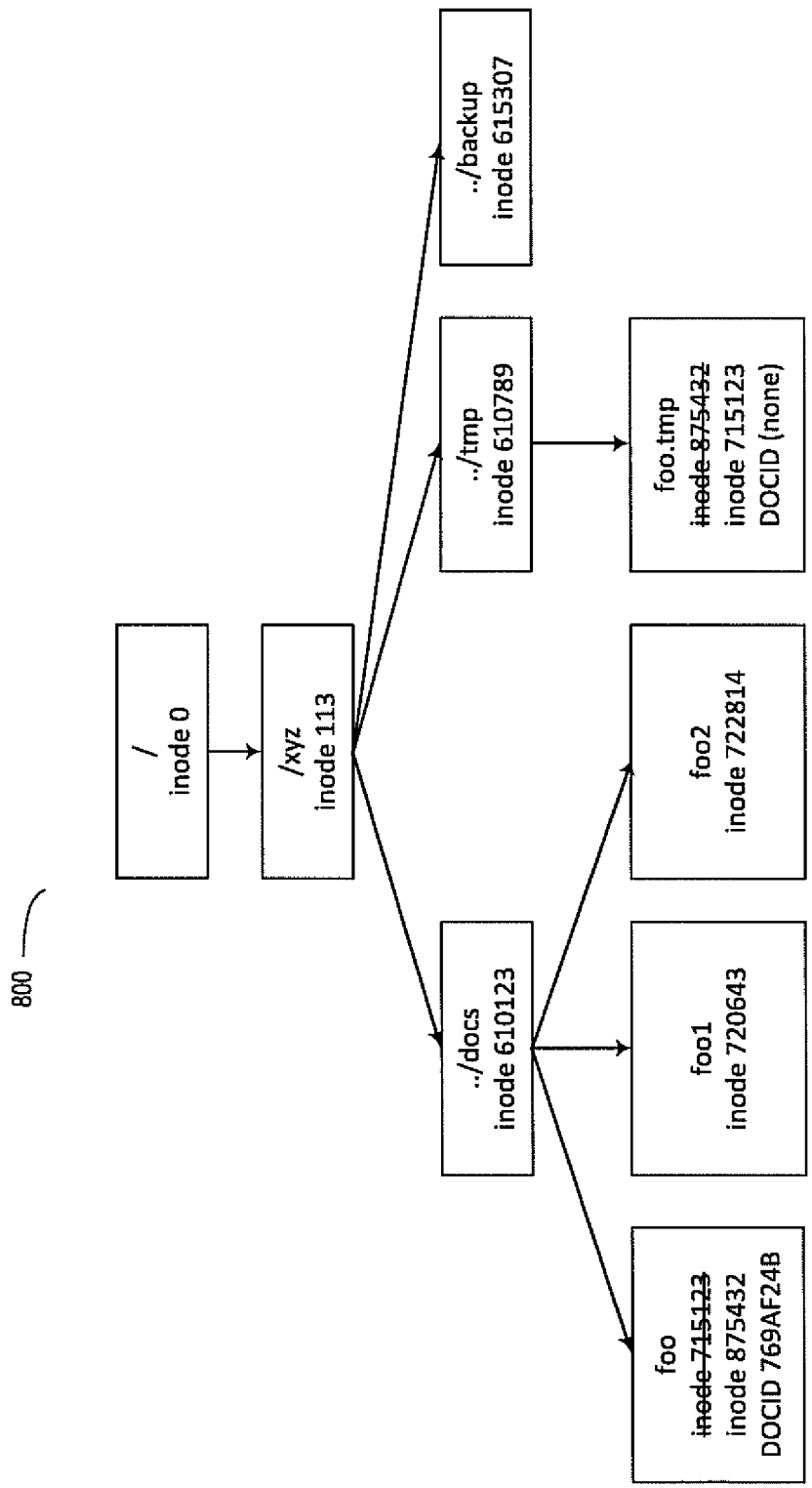
FIG. 8D illustrates an exemplary directory structure of a file system, after an exchange of data between an existing tracked document and a temporary file as a part of a safe save operation, in some embodiments of the invention.

FIG. 8D illustrates an exemplary directory structure 800 of a file system, after performing a data exchange between the existing tracked document, "foo", and the edited temporary file "foo.tmp." The data exchange can be performed by exchanging inode numbers in the directory file entries of the respective files of "foo" and "foo.tmp," and by transferring the DOCID 769AF24B and other metadata of the originally tracked file to the edited temporary file via a tombstone 240 for the originally tracked document. The POSIX file identifiers can optionally be exchanged, but need not be exchanged.

The directory file for directory "../docs" contains an entry for the file "foo" having inode number 715123. As a part of the data exchange process, this entry can be changed to reflect the inode number of the edited temporary file "foo.tmp", with inode number 875432. Similarly, the directory file for the directory "../tmp" can have an entry for the file "foo.tmp" having an inode number of, e.g., 875432. This entry can be changed to reflect the inode number of the original tracked document "foo", with inode number 715123.

At the completion of the data exchange, the kernel 220 can destroy the tombstone 240. In an embodiment, the tombstone 240 can be retained to facilitate rollback of the edits made to the temporary file, to restore the existing document to its original, unedited condition before the data exchange.

Figure 9:
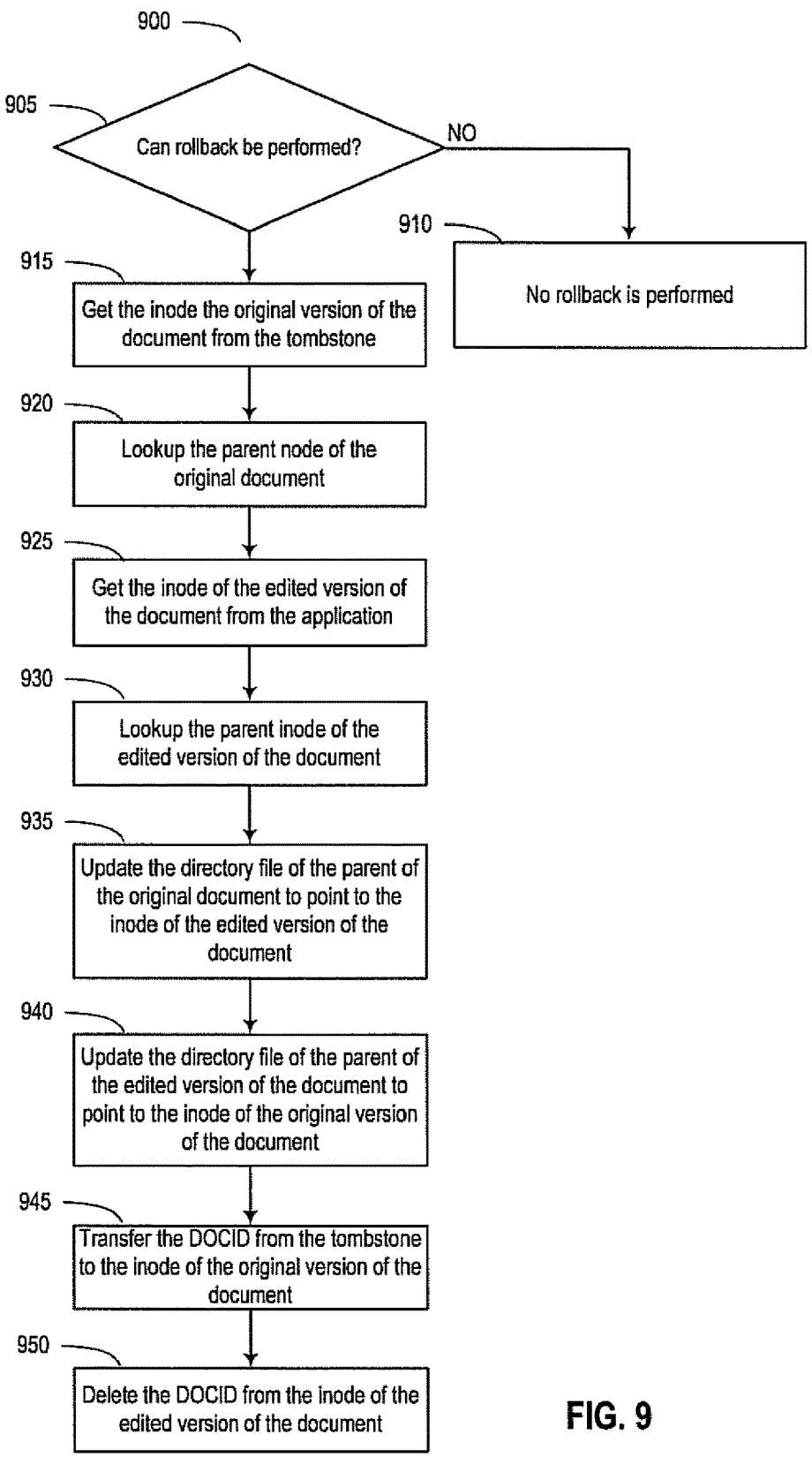
FIG. 9 illustrates a flow chart of a method for rolling back a revision of a tracked document according to some embodiments of the invention.

FIG. 9 describes an embodiment wherein the safe save operation which is being rolled back included an exchange of data between the temporary file and existing document as described with reference to FIG. 8D, above. The following description of a method 900 of performing a rollback will be described with reference to FIG. 8A (before data exchange) and FIG. 8D (after data exchange). A rollback can also be performed after a safe save if the existing document quits its location, such as by being renamed away to a backup or temporary location, as described with reference to FIG. 8C, above.

After a safe save that includes an exchange of data between an existing document and a temporary file containing edits to the existing document, the directory structure may appear as shown in FIG. 8D, above. The file named "foo" in directory "../docs" contains the edited version of the existing document, and the file "foo.tmp" directory "../tmp" contains the existing version of the document. A tombstone 240 can contain a reference to the inode 715123, the inode of the existing document, before the temporary file containing edits was safe saved.

In operation 905, it is determined whether or not a rollback can be performed. A rollback can generally be performed if the rename operation of a safe save did not unlink or delete the existing document, or if the rename operation did not rename the edited version of the tracked document over the existing version of the document. A rollback operation can be performed if the existing document quit its location before the temporary file containing edits to the existing document was renamed over the existing document. A rollback operation can also be performed if the temporary file and the existing document performed a data exchange, such that the content of both files were swapped with one another. In an embodiment the data exchange can be performed by exchanging inode references of the temporary file and existing document.

If, in operation 905 it is determined that a rollback cannot be performed, then in operation 910 the method ends and no rollback is performed.

If, in operation 905 it is determined that a rollback can be performed, then in operation 915, the inode of the original version of the document is obtained from the tombstone 240.

In operation 920, a system call can be made to the file system 215 to look up the parent inode number that points to the inode number of the original version of the document.

In operation 925, the inode number of the edited version of the document can be obtained from the application 205 that has been editing the existing version of the document.

In operation 930, a system call can be made to look up the parent inode number that points to the inode number of the edited version of the document.

In operation 935, the directory file of the parent of the original document ("../tmp"), can be updated to point to the inode of the edited version of the document ("foo" in directory "../docs"). The directory file of the parent "../tmp" then will have an entry that points to the file "foo.tmp" with the inode number of the inode of the edited version of the document.

In operation 940, the directory file of the parent of the edited version of the document can be updated to point to the inode of the original version of the document ("foo.tmp" in directory "../tmp"). The directory file of the parent "../docs" will then have an entry that points to the file "foo" with the inode number of the original version of the document.

In operation 945, the DOCID can be transferred from the tombstone 240 to the inode of the original version of the document.

In operation 950, the DOCID can be deleted from inode of the edited version of the document.

At the completion of method 900, the directory structure 800 should appear as in FIG. 8A, the directory structure 800 before a rename operation.

The above detailed description of the method 900 of FIG. 9 has been described for a rollback of a rename operation that included a data exchange between the temporary file having edits and the original unedited version of the document. A similar method can be applied to a rename operation that includes an operation wherein the unedited version of the document quit its location before a rename operation of the edited version, over the location quit by the unedited version of the document.

Figure 10:
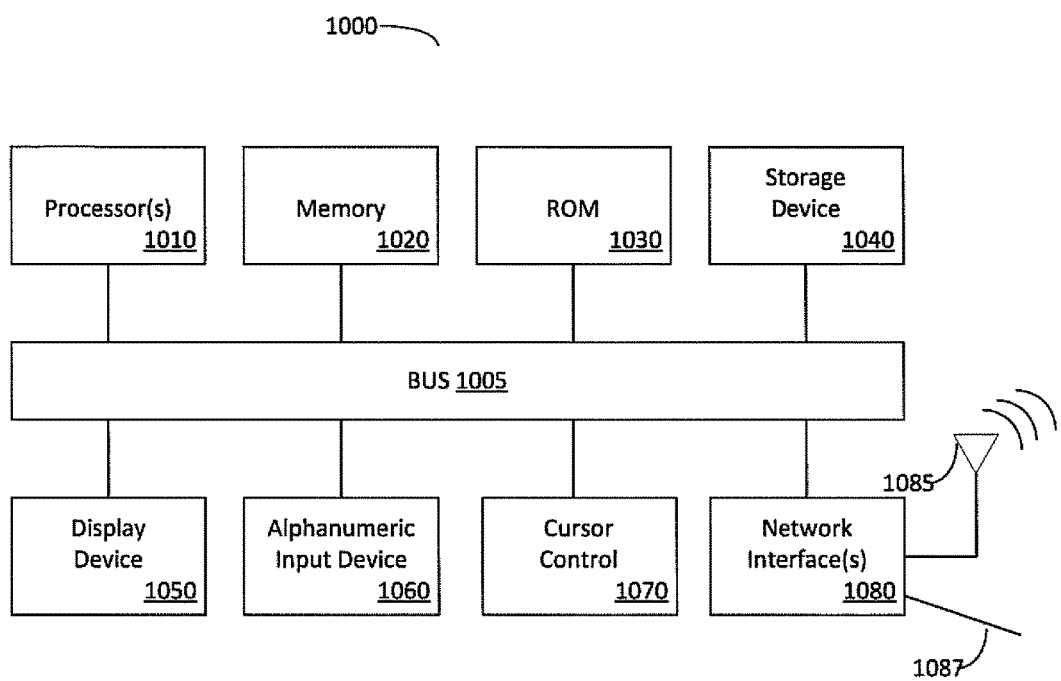
FIG. 10 illustrates a block diagram of a computing system for use in some embodiments disclosed herein.

The computing system illustrated in FIG. 10 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide a client device and/or a server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device 1020 (referred to as main memory), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) and/or other static storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a cathode ray tube (CRT) or liquid crystal display (LCD), to display information to a user. Computing system 1000 can also include an alphanumeric input device 1060, including alphanumeric and other keys, which may be coupled to bus 1005 to communicate information and command selections to processor(s) 1010. Another type of user input device is cursor control 1070, such as a touchpad, a mouse, a trackball, or cursor direction keys to communicate direction information and command selections to processor(s) 1010 and to control cursor movement on display 1050.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of WiFi, Bluetooth and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable In one embodiment, network interface(s) 1080 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

Appendix

In-kernel Document Tracking

Anatomy of a safe-save

Tracking Documents is mostly about tracking safe-saves, because it's the operation that changes the POSIX file ID of a document. If you get safe-save tracking right, then tracking renames or deletions can be done.

There are several safe-saves scenarios. A safe-save mostly always begins with an application asking for a temporary path (file or directory) where it will construct the new document content. When that new content is ready, then there are the following scenarios:

1. the temporary path is renamed atomically over the old content. That only works with files of course, not packages.
2. the application calls exchangedata, which only works on files.
3. the current path is renamed to a backup location (emacs backup files are an example);
   the new content is renamed to the document current location.
4. the current path is renamed to a temporary location;
   the new content is renamed to the document current location;
   the old content is deleted.
5. the current content is unlinked;
   the new content is renamed in its place.

The two first scenarios are simple because those are atomic (1.) or even completely transparent (2.). Some applications, like emacs or AutoCAD, like to create the new content directly in the final place instead of preparing it first, but that doesn't fundamentally change the basic anatomy of a safe-save.

The other important point to note, is that any application that is serious about doing a safe-save will do this sequence of events in a sequential way, from the same thread[1]. If we look closer, to what happens to the root of the document (the file itself if it's a file, or the enclosing directory for a package), for the last three scenarios, there is actually a single pattern:

1. tracked document root is either renamed away or deleted (in other words it quits its current location)

2. a new root, which is (a) not tracked and (b) probably created by a mktemp kind of call, is renamed over the document previous location This pattern is fairly easy to detect for the kernel, without *any* time-based heuristic.

Kernel assigned and persisted Document IDs

*Per inode documentID*

The documentID is an entity that is persisted on the file-system for each tracked file. It is unique on the given file-system, and this invention ensures that no two files ever have the same documentID at any given point in time on a given file system.

Only inodes which are explicitly tracked must have such a tag. Files are never born tracked.

In addition to the described interface, a system interface can be used to forcefully transfer a documentID from a path to another.

*Technical proposal*

Applications can opt into tracking their documents, by marking them as such using a dedicated system Interface (namely on MacOS using the UF_TRACKED BSD flag). Another system interface lets you query the value of the document ID for a given file (namely getattrlist for the ATTR_CMN_DOCUMENT_ID attribute on MacOS).

The kernel persists those documentIDs across safe-saves, in the most automatic fashion possible. To achieve that, the kernel saves "safe save tombstones" (also referred to as tombstones), which are a per-thread state consisting of:

- the node parentid (in other words in which directory this happened)
- the filename it had before the deletion/rename;
- the documentID that document has
- a non owning reference to the original node Such a safe save tombstone is created is when a tracked node is renamed or destroyed (syscalls rename/rmdir/remove/unlink and their *at() variants). The tombstone will remember the original path.

An already tracked document will never inherit another's document ID, hence when we save a new tombstone, it actually replaces the previous one.

Then, for each file-system operation creating a new node, if that happens to match the current per-thread tombstone, then we probably have a safe-save. Such operations can be:

- a rename or link of a non tracked node over the tombstone (same folder, same file-name) with matching owner/permissions (and possibly more security checks);
- the creation of a new node at the same place with open(O_CREAT)/mkdir/creat for the same user.

In that case, the kernel should transfer the document ID from the old node to the new node, untracking the old one, and tracking the new one.

Last but not least, when a node is renamed over an existing one that is tracked:

* if the new node isn't tracked, the document ID is inherited directly (and the per-thread tombstone cleared)

* if the new node is tracked, the previous document ID is gone, and a tombstone is created as per the other rules described herein.

What is claimed is:

1. A computer-implemented method of tracking a document within a file system, the method comprising:
   monitoring, by a kernel, file system operations for the document;
   opening the document for editing, the document having a document identifier that is unique within the file system and is distinct from a filename of the document, the document identifier persistently associated with the most recent version of the document having the filename;
   storing the document identifier;
   generating a temporary file containing the contents of the document, the temporary file having a second filename and the temporary file having no document identifier equivalent to the document identifier of the document opened for editing;
   receiving one or more editing operations upon the document contents in the temporary file;
   determining, by the kernel, that the file system operations include a sequence of file system operations that indicate that a safe save process is being performed; and
   in response to the determining, persistently associating the document identifier with the filename and the most recent version of the contents of the document.

2. The method of claim 1, wherein the document identifier is unchanged by file system operations subsequent to the saving.

3. The method of claim 1, further comprising:
   saving metadata about the document, the metadata comprising the document identifier that is unique within the file system, the document filename, and an inode associated with the document, wherein saving metadata about the document comprises storing the document identifier in an inode of the file system associated with the edited document contents.

4. The method of claim 1, further comprising:
   determining, by the kernel, that an application that caused the sequence of file system operations to be generated has opted in to tracking the document within the file system; and
   wherein the saving is performed in response to determining that the application has opted in to tracking the document within the file system.

5. The method of claim 1, further comprising determining, by the kernel, the document identifier.

6. The method of claim 5, further comprising:
   determining, by the kernel, whether the document already has a document identifier; and performing one of:
   reusing, by the kernel, the document identifier in response to determining that the document already has a document identifier; or
   generating, by the kernel, the document identifier in response to determining that the document does not already have a document identifier.

7. The method of claim 1, wherein the sequence of file system operations that indicate that a safe save process is being performed include:
   generating the temporary file comprising the contents of the document;
   receiving the one or more editing operations;
   saving the temporary file; and
   performing at least one of:
      renaming the temporary file over the document;
      exchanging data between the temporary file and the document;
      renaming the document to a temporary location;
      renaming the document to a backup location; or
      unlinking the document from the file system.

8. The method of claim 1, wherein the temporary file is deleted after the safe save process is performed.

9. A non-transitory computer-readable medium programmed with instructions that, when executed, perform a method of tracking a document within a file system, the method comprising:
   monitoring, by a kernel, a sequence of file system operations for the document;
   opening the document for editing, the document having a document identifier that is unique within the file system and is distinct from a filename of the document, the document identifier persistently associated with the most recent version of the document having the filename;
   storing the document identifier;
   generating a temporary file containing the contents of the document, the temporary file having a second filename and the temporary file having no document identifier equivalent to the document identifier of the document opened for editing;
   receiving one or more editing operations upon the document contents in the temporary file;
   determining, by the kernel, that the sequence of file system operations includes a sequence of file system operations that indicate that a safe save process is being performed; and
   in response to the determining, persistently associating the document identifier with the filename and the most recent version of the contents of the document.

10. The computer-readable medium of claim 9, wherein the document identifier is unchanged by file system operations subsequent to the saving.

11. The computer-readable medium of claim 9, further comprising:
    saving metadata about the document, the metadata comprising the document identifier that is unique within the file system, the document filename, and an inode associated with the document, wherein saving metadata about the document comprises storing the document identifier in an inode of the file system associated with the edited document contents.

12. The computer-readable medium of claim 9, further comprising:
    determining, by the kernel, that an application that caused the sequence of file system operations to be generated has opted in to tracking the document within the file system; and
    wherein the saving is performed in response to determining that the application has opted in to tracking the document within the file system.

13. The computer-readable medium of claim 9, further comprising determining, by the kernel, the document identifier.

14. The computer-readable medium of claim 13, further comprising:
    determining, by the kernel, whether the document already has a document identifier; and performing one of:
    reusing, by the kernel, the document identifier in response to determining that the document already has a document identifier; or
    generating, by the kernel, the document identifier in response to determining that the document does not already have a document identifier.

15. The computer-readable medium of claim 9, wherein the sequence of file system operations that indicate that a safe save process is being performed include:

generating the temporary file comprising the contents of the document;

receiving the one or more editing operations;

saving the temporary file; and performing at least one of:
- renaming the temporary file over the document;
- exchanging data between the temporary file and the document;
- renaming the document to a temporary location;
- renaming the document to a backup location; or
- unlinking the document from the file system.

16. A system comprising:

a processing system programmed with executable instructions that, when executed, perform a machine implemented method of tracking a document within a file system, the method comprising:

monitoring, by a kernel, a sequence of file system operations for the document;

opening the document for editing, the document having a document identifier that is unique within the file system and is distinct from a filename of the document, the document identifier persistently associated with the most recent version of the document having the filename;

storing the document identifier;

generating a temporary file containing the contents of the document, the temporary file having a second filename and the temporary file having no document identifier equivalent to the document identifier of the document open for editing;

receiving one or more editing operations upon the document contents in the temporary file;

determining, by the kernel, that the sequence of file system operations includes a sequence of file system operations that indicate that a safe save process is being performed; and in response to the determining, persistently associating the document identifier with the filename and the most recent version of the contents of the document.

17. The system of claim 16, wherein the document identifier is unchanged by file system operations subsequent to the saving.

18. The system of claim 16, further comprising:

saving metadata about the document, the metadata comprising the document identifier that is unique within the file system, the document filename, and an inode associated with the document, wherein saving metadata about the document comprises storing the document identifier in an inode of the file system associated with the edited document contents.

19. The system of claim 16, further comprising:

determining, by the kernel, that an application that caused the sequence of file system operations to be generated has opted in to tracking the document within the file system; and wherein the saving is performed in response to determining that the application has opted in to tracking the document within the file system.

20. The system of claim 16, further comprising determining, by the kernel, the document identifier.

21. The system of claim 20, further comprising:

determining, by the kernel, whether the document already has a document identifier; and performing one of:

reusing, by the kernel, the document identifier in response to determining that the document already has a document identifier; or generating, by the kernel, the document identifier in response to determining that the document does not already have a document identifier.

22. The system of claim 16, wherein the sequence of file system operations that indicate that a safe save process is being performed include:

generating the temporary file comprising the contents of the document;

receiving one or more editing operations;

saving the temporary file; and performing at least one of:
- renaming the temporary file over the document;
- exchanging data between the temporary file and the document;
- renaming the document to a temporary location;
- renaming the document to a backup location; or
- unlinking the document from the file system.

* * * * *